United States Patent [19]
Henry et al.

[11] Patent Number: 5,611,241
[45] Date of Patent: Mar. 18, 1997

[54] INTEGRAL WELDED SIGHT GLASS FOR BOILERS

[75] Inventors: Sam W. Henry, Ogden; Myron Jensen, Harrisville, both of Utah

[73] Assignee: Emerson Electric Co., St. Louis, Mo.

[21] Appl. No.: 315,966

[22] Filed: Sep. 30, 1994

[51] Int. Cl.⁶ ................................................. G01F 23/02
[52] U.S. Cl. ............................... 73/323; 73/326; 73/328; 116/276
[58] Field of Search .......................... 73/323, 325, 326, 73/328, 329, 330, 334, 331, 332, 333; 116/276

[56] References Cited

U.S. PATENT DOCUMENTS

| | | | |
|---|---|---|---|
| 756,134 | 3/1904 | Neeley | 73/328 |
| 1,473,741 | 11/1923 | Sargent | 73/330 |
| 1,488,065 | 3/1924 | Sargent | 73/330 |
| 1,701,914 | 2/1929 | Ernst | 73/328 |
| 2,299,970 | 10/1942 | Ernst et al. | 73/330 |
| 3,455,163 | 9/1967 | Lukas et al. | |
| 3,968,688 | 7/1976 | Eaton et al. | |
| 5,184,511 | 1/1993 | Barrows et al. | |

FOREIGN PATENT DOCUMENTS

| | | |
|---|---|---|
| 0068971 | 6/1982 | European Pat. Off. |
| 1107409 | 5/1961 | Germany . |
| 660087 | 10/1951 | United Kingdom . |
| 709194 | 5/1954 | United Kingdom . |

*Primary Examiner*—William A. Cuchlinski, Jr.
*Assistant Examiner*—Andrew Hirshfeld
*Attorney, Agent, or Firm*—Polster, Lieder, Woodruff & Lucchesi

[57] ABSTRACT

A sight glass assembly (1) is provided which is securable to a pressure vessel (V). The sight glass assembly includes a body (3) having top, bottom, front, back, and side walls defining a chamber (25) which is in fluid communication with the interior of the vessel. A glass (7) is secured in the sight glass body by a cover (11) to permit viewing of the vessel contents and sensors in the sight glass chamber. A baffle (29) in the sight glass body divides the chamber into a front chamber (33) and a back chamber (31). The baffle causes steam foam or bubbles from the vessel to condense in the back chamber so that only liquid enters the front chamber. The sensors are placed in the front chamber where they cannot be contacted by the foam or bubbles. By preventing foam or bubbles from entering the front chamber, and thus from contacting the sensing devices and the glass, the possibility of false readings by the devices and etching of the glass during operational use of the assembly is reduced.

25 Claims, 4 Drawing Sheets

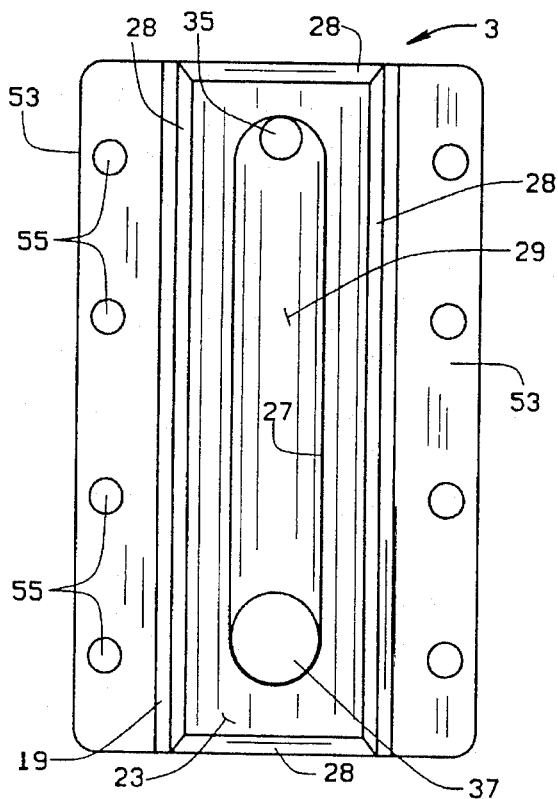
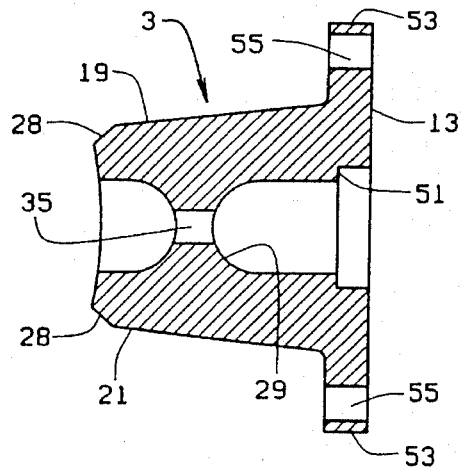
FIG. 8
FIG. 9
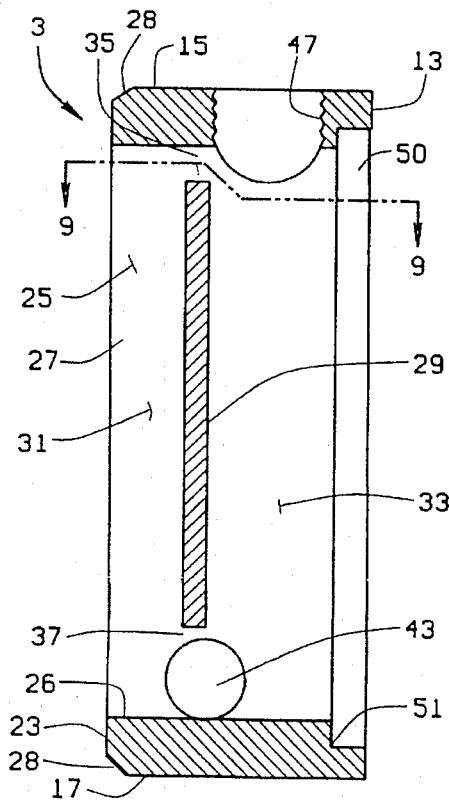
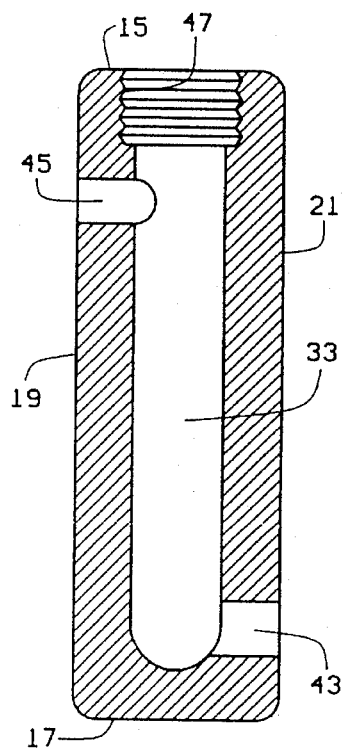
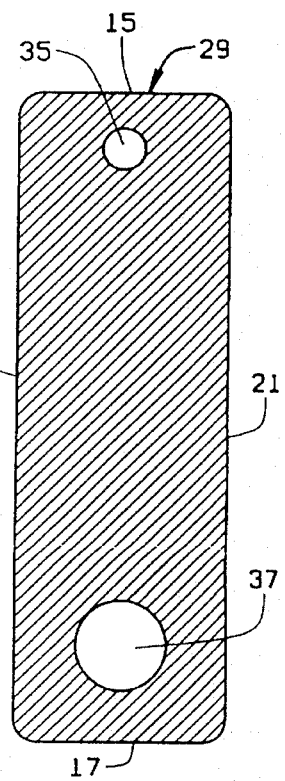
FIG. 10  FIG. 11  FIG. 12

INTEGRAL WELDED SIGHT GLASS FOR BOILERS

BACKGROUND OF THE INVENTION

This invention relates to sight glasses, and in particular, to sight glasses for use with pressurized vessels, such as boilers.

Sight glasses are often used in conjunction with pressure vessels to observe the liquid level in the vessel. A few designs provide an entry port for probes and sensors used to control vessel temperature, pressure, etc. Commercially available sight glasses presently have a single chamber in communication with the interior of the vessel. This exposes the glass of the sight glass and the probes to wet steam from the vessel. In operational use, the hot, wet steam often either condenses on the glass, or etches the glass permanently, making it difficult to observe the liquid and probes contained within the sight glass. The steam also will cause the liquid in the sight glass to bubble or boil resulting in false readings, both from the probe and visual observation, as to the true liquid level in the vessel. The direct contact of the wet steam on the probes may also result in other false readings. The false readings make control of the process in which the vessel is incorporated difficult.

SUMMARY OF THE INVENTION

One object of the present invention is to provide an improved sight glass assembly for use with a pressure vessel.

Another object is the provision of such a sight glass assembly which will reduce the possibility of etching of the glass during operational use.

Another object is the provision of such a sight glass assembly which will reduce the possibility of false readings by instruments placed in the sight glass.

Another object of the present invention is to provide a sight glass assembly in which wet steam, foam, or bubbles will not condense on the glass of the sight glass assembly or around probes and sensors housed in the sight glass assembly.

Another object of the present invention is to produce a sight glass which reduces the number of seals incorporated in the sight glass assembly, and hence the possibility of leakage at or through the sight glass assembly.

Another object of the present invention is the provision of a sight glass assembly which is economical to produce and easy to assemble.

These and other objects will become apparent to those skilled in the art in light of the following disclosure and accompanying drawings.

Briefly stated, a sight glass assembly is provided which is securable to a pressure vessel, such as by welding. The sight glass includes a one-piece body having back, top, bottom, and front surfaces which together define a chamber. The chamber is in communication with an interior of the vessel through an opening in the back surface of the body and an opening in the wall of the vessel. The body front has an opening which is counter-sunk and receives a glass to close the chamber. A cover fits over the glass to secure the glass to the body. The sight glass body is preferably welded to the vessel. Therefore, the only seals used by the sight glass assembly are gaskets placed on either side of the glass to form fluid tight seals between the glass and the body.

A baffle is formed in the chamber to divide the chamber into a back chamber adjacent the mounting surface and a front chamber spaced from the mounting surface. A pair of ports are placed in the baffle to place the front chamber in fluid communication with the back chamber and the interior of the vessel. The body has at least one port formed in its walls which is in communication with the front chamber. The port allows for the insertion of a sensing device into the front chamber.

The baffle prevents steam, foam, or bubbles from entering the front chamber. The steam, foam or bubbles condense against the baffle in the back chamber so that only liquid enters the front chamber. This enables the sensing devices to sense the conditions of the vessel more accurately and reduces the occurence of false signals emitted by the devices when gasses are allowed to contact the sensing devices. The baffle also prevents the hot steam, foam or bubbles from contacting the glass and thus reduces the etching of the glass.

BRIEF DESCRIPTION OF THE DRAWINGS

FIG. 8 is a back plan view of the body;

FIG. 9 is a cross-sectional view of the body taken along line 9—9 of FIG. 10;

FIG. 10 is a cross-sectional view of the body taken along line 10—0 of FIG. 4;

FIG. 11 is a cross-sectional view taken along line 11—11 of FIG. 4;

FIG. 12 is a cross-sectional view taken along line 12—12 of FIG. 4;

DESCRIPTION OF THE PREFERRED EMBODIMENT

Figure 1:
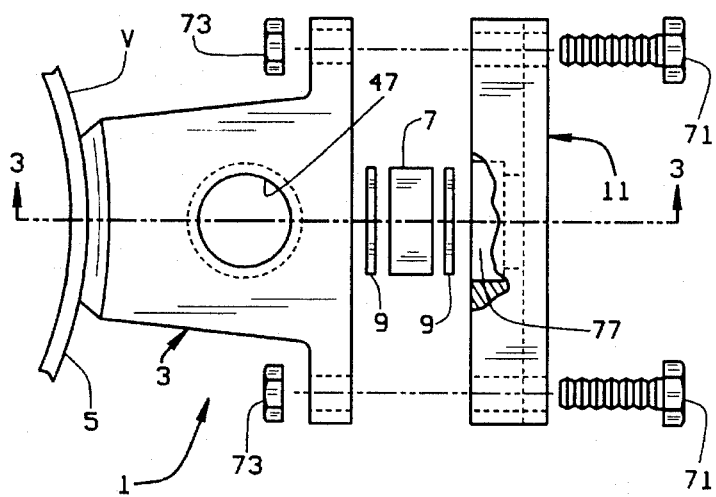
FIG. 1 is an exploded top plan view, partly in section, of a sight glass assembly of the present invention, the sight glass body being mounted to a pressure vessel.
Figure 2:
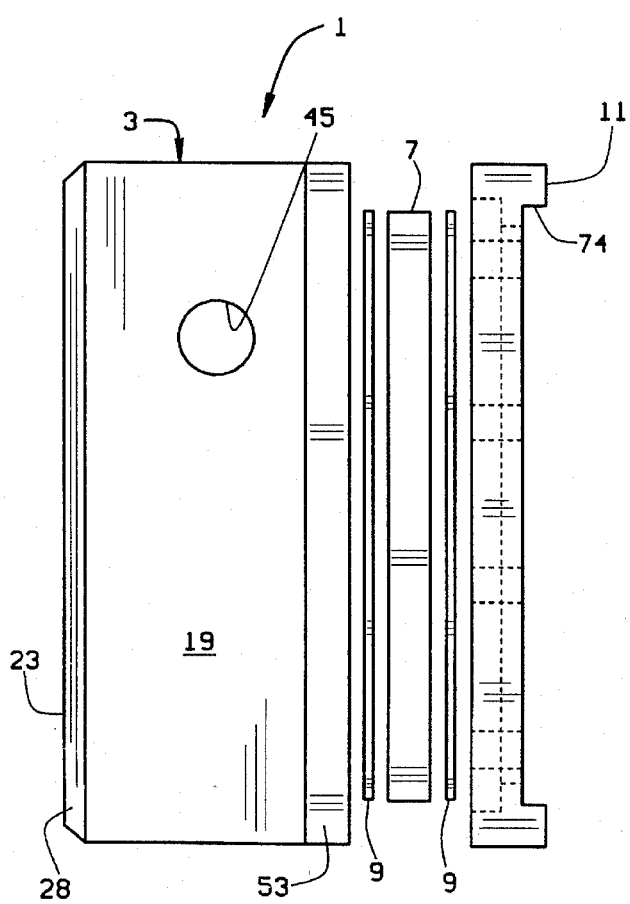
FIG. 2 is an exploded, side elevational view of the sight glass assembly.
Figure 3:
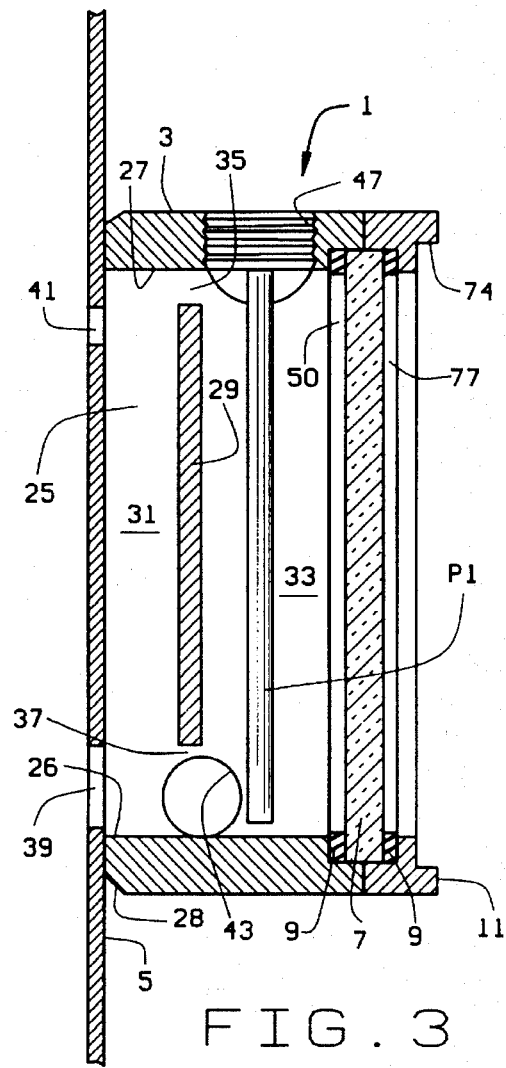
FIG. 3 is a cross-sectional view of the sight glass assembly mounted to the vessel, taken along lines 3—3 of FIG. 1, with a probe being housed in the assembly.
Figure 4:
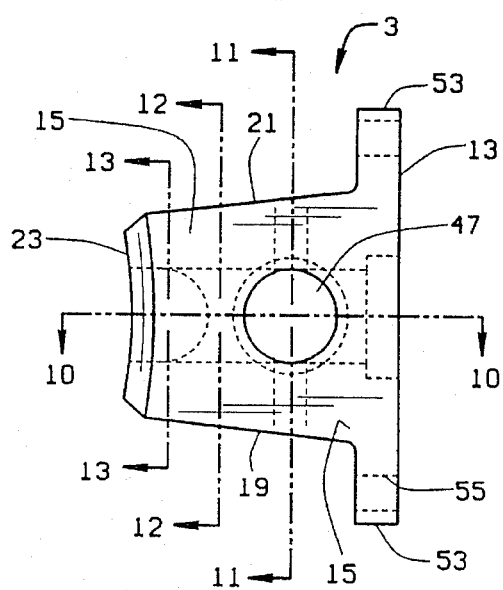
FIG. 4 is a top plan view of a body of the sight glass with ports of the sight glass body being shown in phantom.
Figure 5:
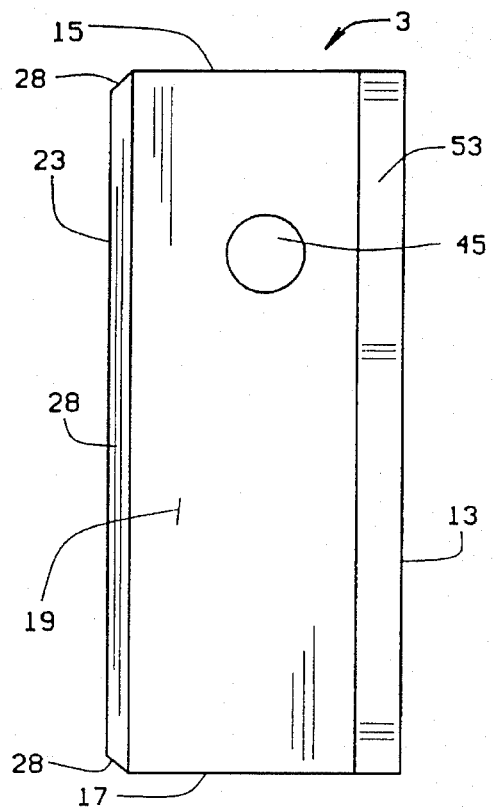
FIGS. 5 and 6 are side elevational views of the two sides of the body.
Figure 6:
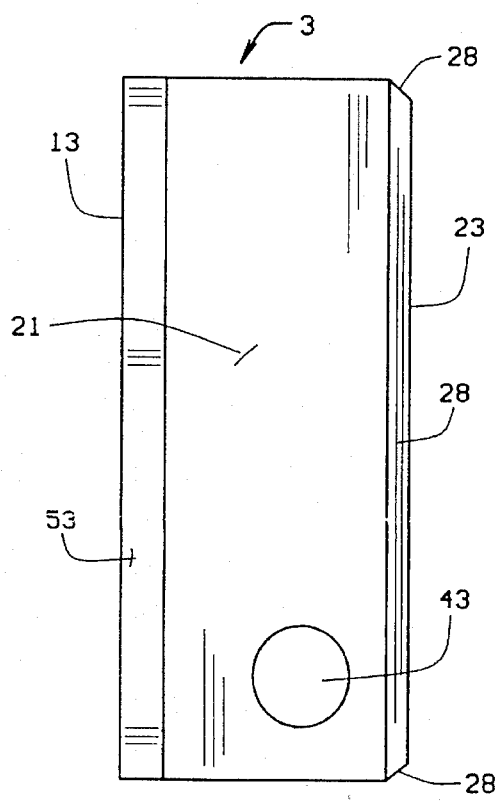
Figure 7:
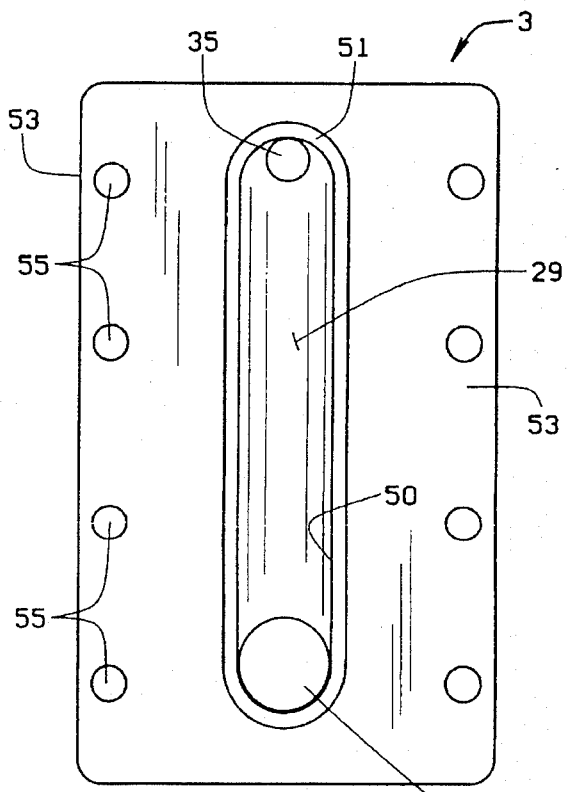
FIG. 7 is a front elevational view of the sight glass assembly.
Figure 13:
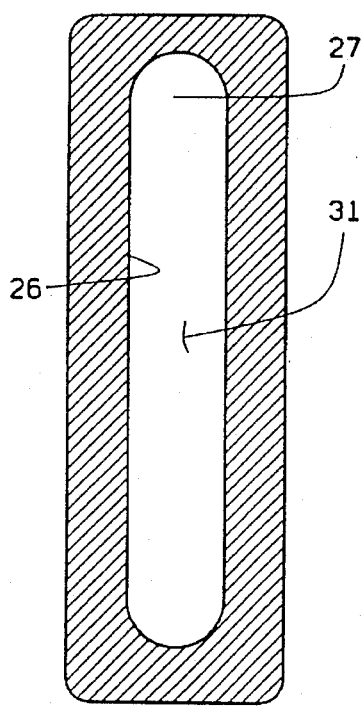
FIG. 13 is a cross-sectional view taken along line 13—13 of FIG. 4.

An illustrative embodiment of a sight glass assembly 1 of the present invention is shown in FIGS. 1–3. Assembly 1 includes a sight glass body 3 which is mounted to an outer surface of a wall 5 of a vessel V, such as a boiler. A glass 7, surrounded by a pair of gaskets 9, is received in body 3 and is secured in place by a cover or lid 11. Although the sight glass 1 is described as being mounted to a pressure vessel, it will be apparent that the sight glass of the present invention may be used with any vessel.

Body 3 is shown in more detail in FIGS. 4–13. Body 3 has front 13, top 15, bottom 17, sides 19 and 21, and back 23 surfaces, which together define a chamber 25 (FIG. 10). Back surface 23 is preferably curved to conform to the curvature of the vessel wall 5 to which the assembly 1 is mounted. The body 3 is physically mounted to vessel 3, by welding, for example. The back wall 23 has an elongate opening 27 to chamber 25. Opening 27 is defined by a wall or surface 26. The wall 5 of vessel V has a port 39 and a port 41 formed therein (FIG. 3). The ports 39 and 41 communicate with the chamber 25. Although gaskets could be used to form a fluid tight seal between the vessel V and the sight glass body 3, the form of attachment of the body to the vessel is such that a gasket is not needed, and therefore is preferably not provided. This reduces the number of seals needed by the sight glass assembly 1. The outer surfaces of body 3 are preferably chamfered, as at 28 (FIGS. 8–10), to define an area of transition between the back wall 23 and the sides, top, and bottom of the body 3.

A baffle 29 is formed in chamber 25 forwardly of opening 27 and divides chamber 25 into a back chamber 31 and a front chamber 33. The baffle has concave, generally semi-circular front and rear surfaces. (See FIG. 9) An upper port 35 and a lower port 37 are formed in baffle 29 near the top and bottom, respectively, of the body to place front chamber 33 in fluid communication with the interior of vessel V through the back chamber 31. As seen, ports 35 and 37 are formed to be at the top and bottom, respectively, of opening 27. Lower port 37 is shown to be larger than port 35 and preferably has a diameter about twice that of port 35. Corresponding ports 39 and 41 (FIG. 3) are formed in vessel wall 5 so that chambers 31 and 33 will be in fluid communication with the interior of the vessel. Vessel ports 39 and 41 are shown to be of different sizes, but may be of the same size if desired. The body 3 is preferably molded or cast, and the baffle is molded or cast in the body when the body is formed. Baffle 29 could alternatively be a separate piece which is secured in body 3.

Body 3 is mounted to vessel wall 5 so that back surface 23 surrounds the vessel ports 39 and 41, i.e., ports 39 and 41 are within opening 27 to be surrounded, contained, or enclosed by opening wall 26. The vessel ports are preferably formed so that vessel port 39 is axially aligned with body port 37 and vessel port 41 is axially or vertically offset from body port 35, as seen in FIG. 3. The offset of vessel port 41 and body port 35 prevents a direct flow of fluid from vessel V to body chamber 33. Because the fluid flowing through vessel port 41 will impact the baffle 29 prior to entering body chamber 33, the amount of gas bubbles or foam that enter chamber 33 is reduced.

Sight glass body 3 also includes a drain port 43 formed in wall 21, a probe port 45 formed in wall 19, and a probe port 47 formed in top 15. As best seen in FIG. 10, all three ports are in direct communication with forward chamber 33. Drain port 43 is formed at the bottom of the chamber. A drain tube having a valve may be connected to port 43 so that the assembly 1 can be drained when desired.

Port 45 is a steam port. Sensing equipment, such as pressure probes may be placed in communication with the interior of vessel V through port 45. The pressure probe may be connected to appropriate switching devices to control the pressure within the vessel based on the output from the pressure probe.

Electronic sensors and test probes P1 are placed in communication with the interior of vessel V through port 47. These may include temperature and level probes to monitor the temperature and level of the fluid within the vessel and sensors which monitor other desired properties of the fluid in the vessel. Again, these probes and sensors may be connected to appropriate control devices to control the desired properties of the fluid contained within the vessel.

The body front surface 13 has an opening 50 which is counter-sunk to define a shoulder 51. Glass 7 is placed in opening 50 to be seated on shoulder 51. A gasket 9 is preferably placed between the glass 7 and shoulder 51 to form a fluid tight seal therebetween. Gasket 9 is preferably shaped to conform to the dimensions of shoulder 51 so that it does not extend beyond the shoulder into opening 50. Glass 7 and vessel wall 5 thus define the front and back walls, respectively, of chamber 25. Front surface 13 also includes elongate flanges 53 extending outwardly from side walls 19 and 21. A plurality of bolt holes 55 are formed in each flange.

Figure 14:
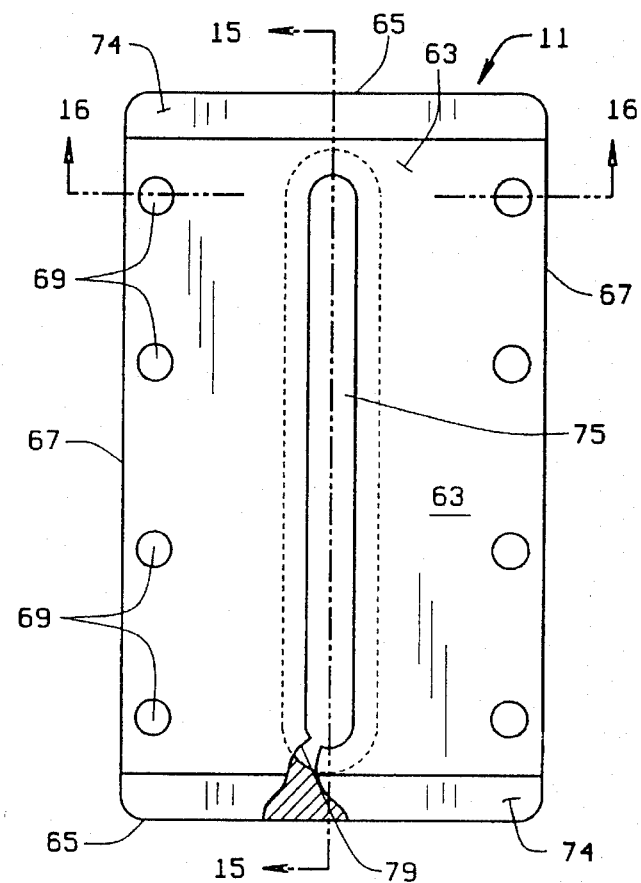
FIG. 14 is a front plan view, partly broken away, of a cover of the sight glass assembly.
Figure 15:
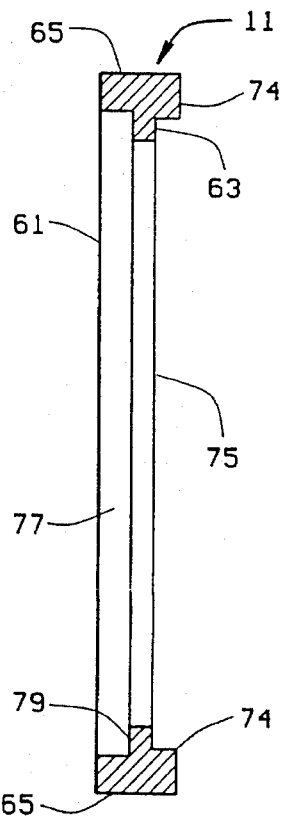
FIG. 15 is a cross-sectional view of the cover taken along line 15—15 of FIG. 14.
Figure 16:
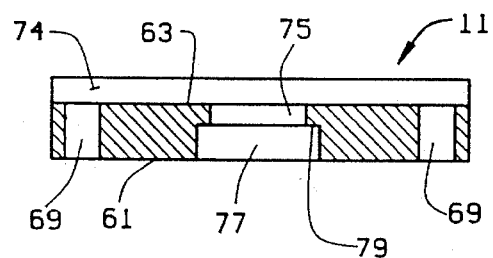
FIG. 16 is a cross-sectional view of the cover taken along line 16—16 of FIG. 14.

The sight glass cover 11 is best shown in FIGS. 14–16. Cover 11 includes a back wall 61, a front surface 63, top and bottom surfaces 65, and side surfaces 67. The cover back wall 61 is sized and shaped to cover the flanges 53 of body 3 to close the chamber 25. A plurality of bolt holes 69 extend through cover 11 and are aligned with bolt holes 55 in body flanges 53. Bolts 71 (FIG. 1) pass through the bolt holes 55 and 69 and receive nuts 73 to secure the cover 11 to the body 3. Body flange bolt holes 55 may be tapped to accept screws, to eliminate the need for nuts 73. Ribs 74 preferably extend across front surface 63 at the top and bottom thereof.

An elongate, preferably oval, opening 75 is formed in cover 11. Opening 75 is counter-bored at 77 to define a shoulder 79. Glass 7 is received within counter-bore 77 to seat against shoulder 79, as seen in FIGS. 1 and 3. Another gasket 9, which conforms in shape to the shape of shoulder 79, is placed between the glass 7 and shoulder 79 to provide a fluid tight seal or cushion between the glass and the cover. Gaskets 9 are both generally oval and are set against the walls of their respective shoulders and near the periphery of the glass 7. Opening 75 is approximately the same size as body opening 50.

When sight glass assembly 1 is used with a pressure vessel, such as a boiler, the steam, foam, bubbles, and water produced by the boiler enter the assembly 1 through vessel ports 39 and 41. The steam condenses against the baffle 29 in back chamber 31 and liquid enters the front chamber 33 through port 37. Only condensed fluid (i.e. liquid) enters front chamber 33 and reaches the glass 7 and probe P1. Thus no hot bubbles or foam which will etch the glass entering the front chamber 33. Virtually no bubbles or foam reach the front chamber 33. Because no bubbles or foam enter the front chamber 33, where the sensing devices are located, no bubbling of the liquid occurs in the front chamber. Thus, a true liquid level will be measured by the probe and visible through the sight glass. Further, because the liquid is not being affected by bubbles or foam, and because a true liquid level is being shown, the probes and sensors inserted through ports 45 and 47 will not produce false signals which would otherwise be produced if bubbles or foam did reach the probes. Baffle 29, thus shields the probes from the bubbles or foam to reduce the possibility of false readings. Better control of the vessel (i.e. vessel temperature, pressure, etc.), and the production line in which it is incorporated, is thus achieved.

Variations within the scope of the apended claims will be apparent to those skilled in the art. The foregoing description is thus set forth for illustrative purposes only and is not meant to be limiting.

We claim:

1. In combination, a liquid vessel and a sight glass assembly, the liquid vessel including a wall having at least one opening through it and the sight glass assembly being secured to the wall of the vessel; said sight glass assembly including:

a body having a plurality of surfaces which together define a chamber, said plurality of surfaces including a back surface and a front surface; said back surface having an opening formed therein in fluid communication with said at least one vessel opening to place said chamber in fluid communication with said vessel; said front surface defining an opening;

a baffle in said chamber, said baffle dividing said chamber into a back chamber adjacent said back surface and a front chamber spaced from said back surface, said baffle including at least one port extending through said baffle to place said front chamber in fluid communication with said back chamber and hence the interior of said vessel, said at least one baffle port being at least partly aligned with said at least one vessel opening;

a glass positioned over said front surface opening to close said front surface opening; and a cover for said body, said cover fitting over said glass to secure said glass to said body.

2. The combination of 1 wherein said at least one port of said baffle includes a first port and a second port.

3. The combination of claim 2 wherein one of said first and second baffle ports is larger in diameter than the other of said first and second baffle ports.

4. The combination of claim 3 wherein said at least one opening of said vessel includes two ports.

5. The combination of claim 4 wherein said sight glass body is welded to said vessel wall, said body back surface opening being aligned with said at least one vessel opening.

6. The combination of claim 5 wherein said at least one vessel opening includes a first opening and a second opening, said body back surface opening comprising a single elongate opening sized and shaped to surround both said first and second vessel openings.

7. In combination, a liquid vessel and a sight glass assembly, the liquid vessel including a wall having two ports through it and the sight glass assembly being secured to the wall of the vessel; said sight glass assembly including:

a body having back, top, bottom, side and front surfaces which together define a chamber; said back surface having an opening formed therein in fluid communication with said vessel ports to place said chamber in fluid communication with an interior of said vessel; said front surface defining an opening;

a baffle in said chamber, said baffle dividing said chamber into a back chamber adjacent said back surface and a front chamber spaced from said back surface, said baffle including a first port and a second port extending through said baffle to place said front chamber in fluid communication with said back chamber and hence the interior of said vessel, one of said first and second baffle ports being larger in diameter than the other of said first and second baffle ports;

a glass positioned over said front surface opening to close said from surface opening; and a cover for said body, said cover fitting over said glass to secure said glass to said body;

said body back surface opening surrounding said vessel ports; one of said vessel ports being axially aligned with said baffle first port, the other of said vessel ports being offset from said baffle second port.

8. The combination of claim 7 wherein said body surfaces have at least one probe port for receiving a probe to monitor a desired condition of fluid in said vessel.

9. The combination of claim 8 wherein said at least one probe port is in direct communication with said from chamber.

10. The combination of claim 7 wherein said body front surface defines a shoulder surrounding said front surface opening, said glass being seating on said shoulder.

11. The combination of claim 10 wherein said cover has an opening which receives said glass, said cover sized and shaped to receive said glass; said body chamber being visible through said cover opening and said glass.

12. The combination of claim 7 wherein said body includes flanges having holes extending therethrough; said cover having holes aligned with said body flange holes, said body and cover holes receiving fasteners which secure said cover and body together.

13. The combination of claim 12 including a first gasket positioned between said body and said glass and a second gasket positioned between said cover and said glass for forming fluid tight seals and for forming a cushion between said glass and said body and between said glass and said cover.

14. A sight glass assembly which is securable to a vessel, said sight glass assembly including:

a one-piece body having back, top, bottom, side, and front surfaces which together define a chamber; said front surface defining an opening; said back surface defining an opening to place said chamber in fluid communication with said vessel, such that fluid flows into said chamber generally perpendicularly to said back surface;

a baffle in said chamber, said baffle dividing said chamber into a back chamber adjacent said back surface and a front chamber spaced from said back surface, said baffle having a first port and a second port to place said front chamber in fluid communication with said back chamber, said baffle ports being aligned with said back surface opening;

a view glass positioned over said front surface opening to close said front surface opening; and a cover for said one-piece body, said cover fitting over said view glass to secure said view glass to said body.

15. The sight glass assembly of claim 14 including at least one probe port in one of said body surfaces, said probe port being direct communication with said front chamber for receiving a sensing device.

16. The sight glass assembly of claim 15 wherein said body front surface defines a shoulder on which said glass sits, said shoulder surrounding said front surface opening.

17. The sight glass assembly of claim 16 wherein said cover has an opening defined by a shoulder in said cover, said cover shoulder being shaped and sized to fit over said view glass, said front chamber being visible through said cover opening and said view glass.

18. The sight glass assembly of claim 17 including at least one gasket, said at least one gasket being placed between one of said glass and said body shoulder, and said glass and said cover shoulder.

19. The sight glass assembly of claim 18 wherein said body and said cover have aligned holes extending therethrough for receiving fasteners which secure said cover and body together.

20. A sight glass assembly which is securable to a wall of a vessel for monitoring contents of said vessel, said sight glass assembly including a body securable to said vessel, a view glass, and a cover securable to said body to secure said view glass in said assembly;

said body having a front wall, a back wall, top and bottom walls, and side walls defining a chamber, said back wall having at least one opening to place said chamber in communication with an interior of said vessel, said front wall having an opening which is covered by said glass;

said cover including a recessed opening which receives said glass, said cover being secured to said body to fix said glass in said assembly; and a baffle in said chamber, said baffle dividing said chamber into a back chamber adjacent said back wall and a front chamber spaced from said back wall, said baffle including at least one port extending through said baffle to place said front chamber in fluid communication with said back chamber, said at least one baffle port being at least partially aligned with said at least one opening in said back wall.

21. The sight glass assembly of claim 20 wherein when wet steam, bubbles or foam enter said sight glass assembly, said wet steam, bubbles or foam condense against said baffle in said back chamber so that only liquid enters said front chamber.

22. The sight glass assembly of claim 21 including a probe port extending through one of said body walls, said probe port being in direct fluid communication with said body front chamber for receiving a sensor through said probe port to place said sensor in said front chamber.

23. The sight glass assembly of claim 22 including a second probe port and a drain port.

24. The sight glass assembly of claim 23 wherein said second probe port and said drain port are spaced vertically from each other.

25. The sight glass assembly of claim 24 wherein said first and second probe ports and said drain port are each on a different of said surfaces of said sight glass assembly.

* * * * *

UNITED STATES PATENT AND TRADEMARK OFFICE
CERTIFICATE OF CORRECTION

PATENT NO. : 5,611,241
DATED : March 18, 1997
INVENTOR(S) : Sam W. Henry and Myron Jensen It is certified that error appears in the above-indentified patent and that said Letters Patent is hereby corrected as shown below:

Claim 9, Col. 6, line 5, the word "from" should be ---front---.

Signed and Sealed this

Thirtieth Day of December, 1997

Attest:

BRUCE LEHMAN

Attesting Officer

Commissioner of Patents and Trademarks